(12) United States Patent
Sinclair et al.

(10) Patent No.: US 6,327,781 B1
(45) Date of Patent: Dec. 11, 2001

(54) TRIMMER HANDLE

(75) Inventors: Peter Lee Sinclair; Nicholas John Butcher, both of Suffolk (GB)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/482,341

(22) Filed: Jan. 14, 2000

(30) Foreign Application Priority Data

Jan. 19, 1999 (GB) .................................................. 9901056

(51) Int. Cl.⁷ ...................................................... A01G 3/06
(52) U.S. Cl. .................................. 30/276; 30/298; 30/340
(58) Field of Search .......................... 30/276, 347, 296.1, 30/298, 382, 491, 122, 170, 517, 340, 329; 56/12.7; 172/13, 14; 294/58

(56) References Cited

U.S. PATENT DOCUMENTS

| 4,894,914 | * | 1/1990 | Mead | 30/276 |
| 5,474,350 | * | 12/1995 | Gauthier | 294/58 |
| 5,662,428 | * | 9/1997 | Wilson | 30/276 X |

* cited by examiner

*Primary Examiner*—Douglas D. Watts
(74) *Attorney, Agent, or Firm*—Venable; John P. Shannon; Chad C. Anderson

(57) ABSTRACT

A hand-held tool has a powered work tool at one end of a handle shaft, and a first handle and a second handle at the opposite end of the handle shaft, the second handle being adjustable between a first position and a second position. The second handle in its first position cooperates with the first handle to provide for two-handed operation, and the second handle in its second position cooperates with the first handle to provide support for the wrist and/or forearm of a user grasping the first handle with one hand in a single-handed operation.

17 Claims, 7 Drawing Sheets

TRIMMER HANDLE

This invention relates to a hand-held tool, particularly a garden tool such as a vegetation line trimmer, having a powered work tool at one end of a handle shaft.

In such a tool, the other end of the shaft is generally provided with a shaped handle which the user grasps with one hand when maneuvering the work tool over the area being worked. When the work tool is at the end of a relatively long shaft, the user has to apply considerable muscular effort to maintain the tool clear of the ground. The muscles of the arm supporting the tool can therefore begin to ache after operating the tool over a period of time.

To alleviate this problem, it is known to provide the handle shaft of such a tool with a second handle which the user may then grasp with his other hand. Two-handed operation is generally less tiring but can also be less convenient than single-handed operation.

For single-handed operation, it is also known to provide the handle shaft with a wrist and/or forearm support to give additional leverage when grasping the handle and thereby reduce the muscular strain.

According to the present invention there is provided a hand-held tool having a first handle and a second handle at one end of a handle shaft, wherein the second handle is adjustable between a first position and a second position, the second handle in its first position co-operating with the first handle to provide for two-handed operation, and the second handle in its second position co-operating with the first handle to provide support for the wrist and/or forearm of a user grasping the first handle with one hand in a single-handed operation. Preferably, the second handle is pivotally mounted for movement between the first position and the second position, and means are provided for releasably locking the handle in either one of the two positions. Moreover, at least one of the two positions is preferably adjustable and the handle is then releasably lockable in any one of a plurality of predetermined first and/or second positions.

In this manner a single component provides either a second handle or a wrist/arm support, and the user has the option of either two-handed operation or single-handed operation with wrist/forearm support.

In a vegetation line trimmer embodying the invention, the first handle preferably lies in a plane containing the handle shaft, while the second handle pivots from its first position to its second position about an axis transverse to the handle shaft. The user preferably grasps the first handle at a location forward of the center line of the shaft.

By way of example only, a line trimmer embodying the invention will now be described with reference to the accompanying drawings in which.

Figure 1:
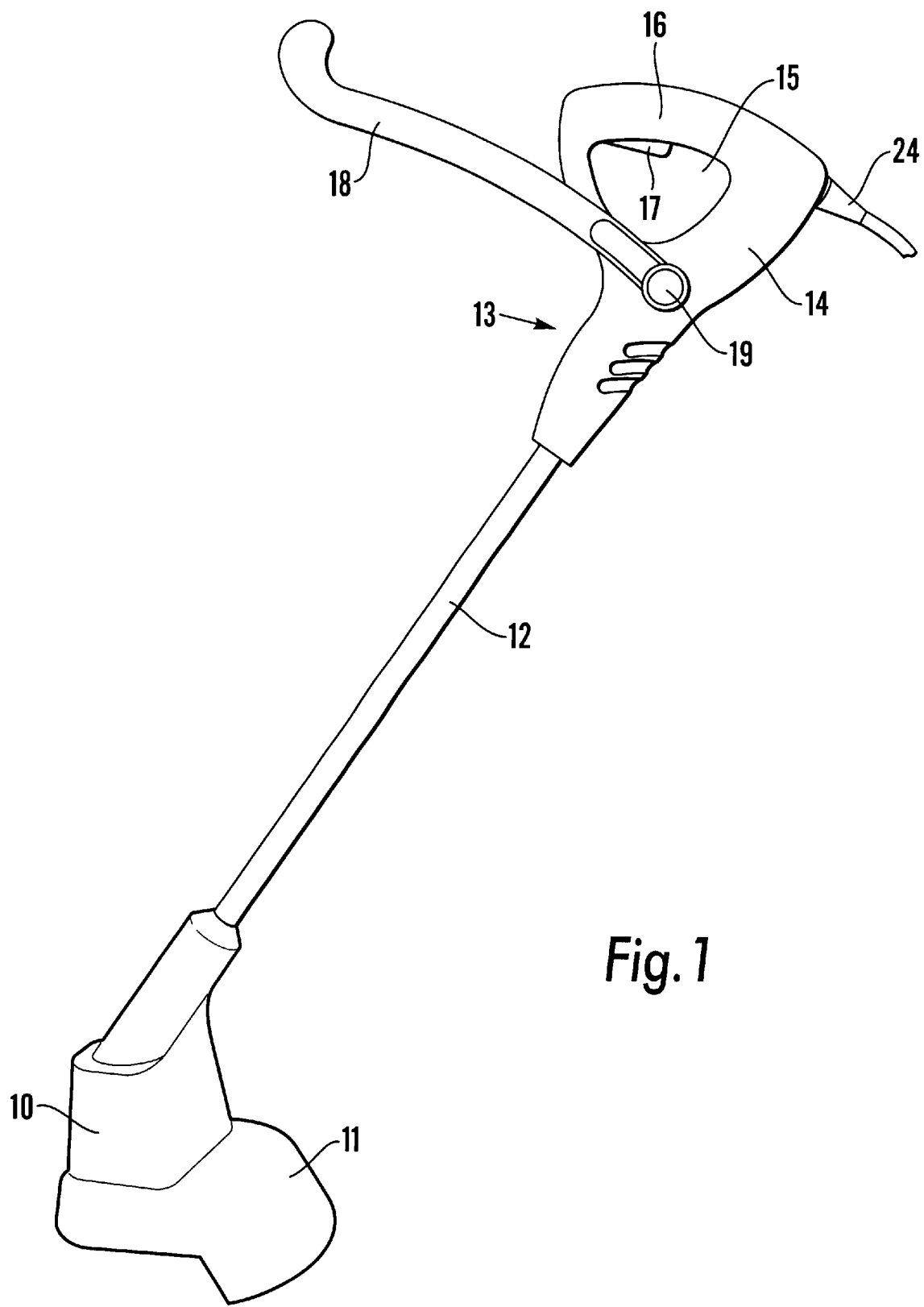
FIG. 1 is a side view of the line trimmer adapted for two-handed operation.

Referring to the drawings, the illustrated trimmer has an electric motor enclosed within a motor housing 10 and driving a nylon line cutter, the end of the line projecting from a spool and rotating at high speed beneath the guard 11 to produce a flail-type cutting action for trimming grass and other vegetation. This part of the trimmer is conventional and will not therefore be described or illustrated in further detail.

Extending upwardly and rearwardly from the motor housing 10 is a handle shaft 12. The bottom end of the shaft is connected to the motor housing in any convenient manner while the top end of the shaft connects to a handle unit 13.

The handle unit 13 consists of a first handle 14 which lies generally in the vertical plane of the shaft 12 and forms a closed loop 15 forward of the shaft. The user is able to grasp the top portion 16 of the handle 14 by inserting his fingers into the opening formed by the closed loop 15 and resting the palm of his hand on the top of the handle. In this position, by squeezing, the user is able to depress an actuating lever 17 projecting from an opening in the underside of the top portion 16 of the handle to close an electric switch and energize the motor. The handle 14 is preferably formed as a hollow molding and the switch (not shown) is then located within the hollow top portion 16 of the handle. One side of the switch is electrically connected to the motor and the other side to a main power supply through cable 24 in a conventional manner.

By grasping the top portion 16 of the handle 14 with one hand, the user is therefore able to lift the trimmer clear of the ground and to maneuver it over the ground while maintaining a power supply to the motor. However, over a period of time, the muscular effort to maintain the trimmer in this position is substantial.

Figure 3:
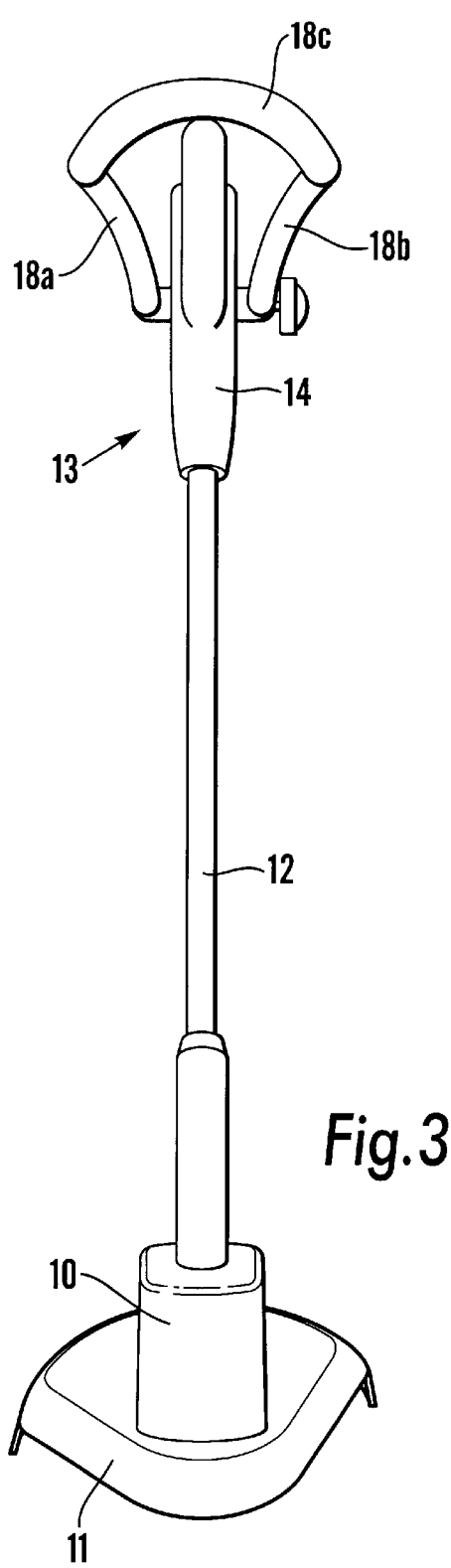
FIG. 3 is a front view of the trimmer shown in FIG. 1.

The handle unit 13 therefore includes a second handle 18 which can be locked in one of two alternative positions. FIG. 1 and FIG. 3 show the handle 18 in a first position in which it projects forwardly at an angle of about 90° to the shaft 12. The handle is carried on a spindle 19 passing through the first handle 14 and includes two forwardly extending arms 18a, 18b joined by a crosspiece 18c. By locking the second handle 18 in this first position, grasping the crosspiece 18c with one hand, and pulling upwardly, the user is able to supplement the lifting force exerted by the other hand grasping the first handle 14.

Figure 2:
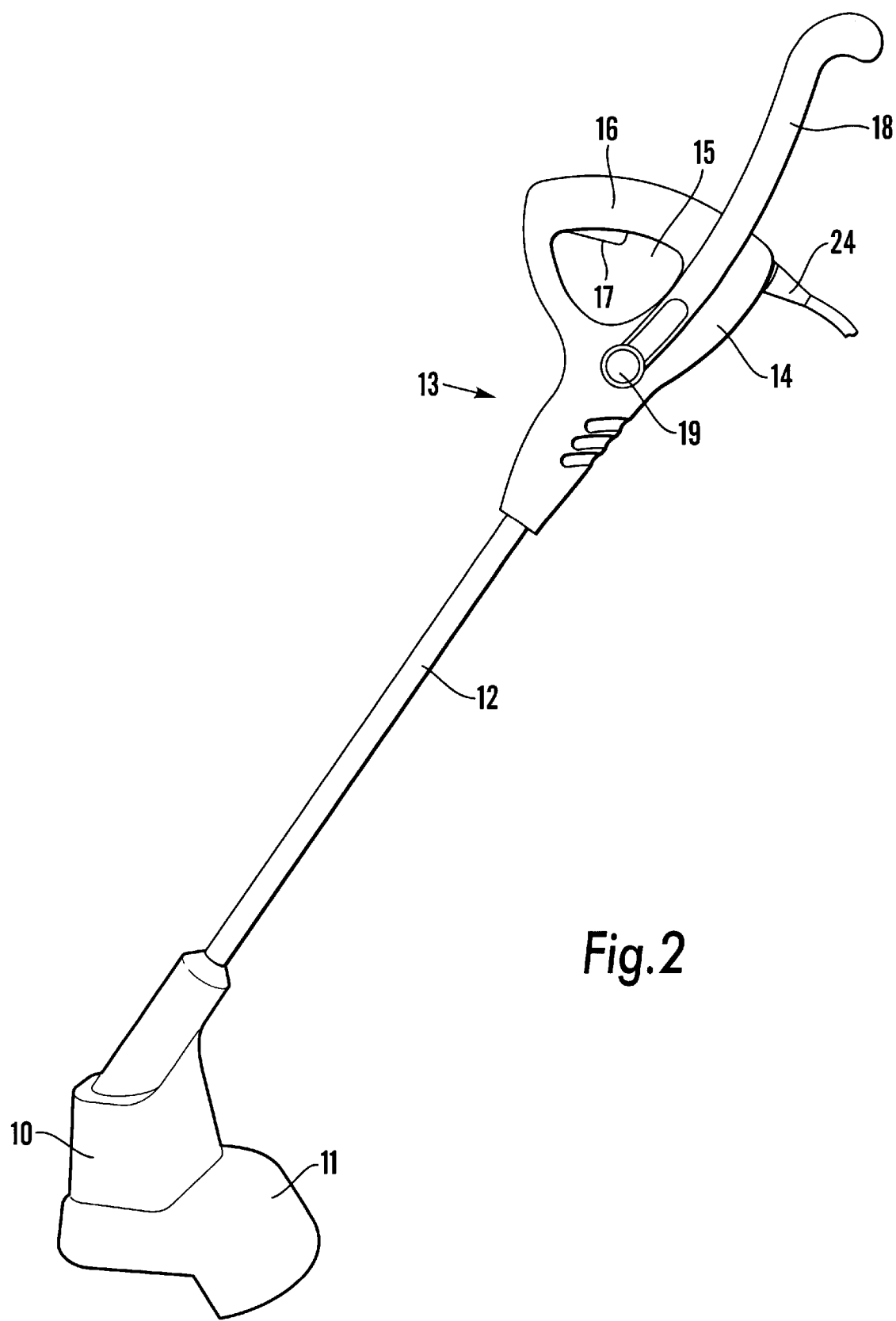
FIG. 2 is a side view similar to FIG. 1 but with the trimmer converted to single-handed operation.
Figure 4:
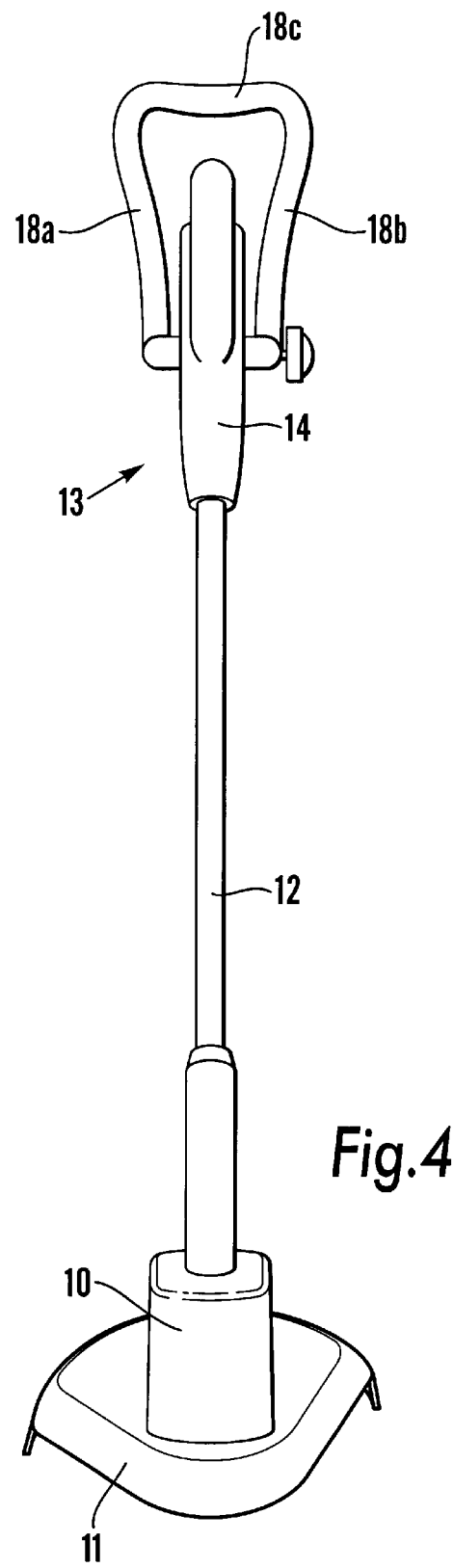
FIG. 4 is a front view of the trimmer shown in FIG. 2.
Figure 5:
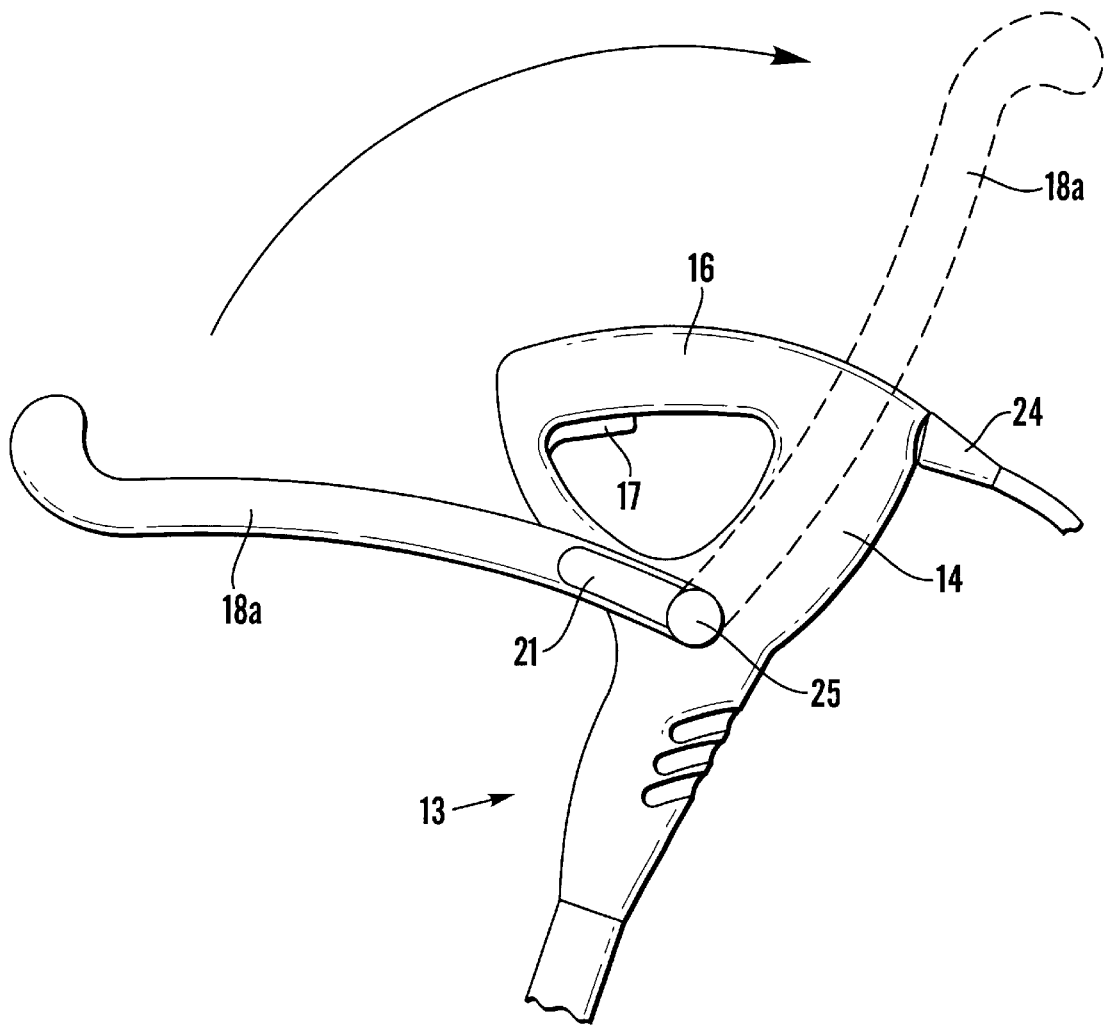
FIG. 5 is a detail of FIGS. 1 and 2 viewed from the opposite side.

Alternatively, should the user prefer one-handed operation, the second handle 18 can be pivoted about the spindle 19 into the second position shown in FIGS. 2 and 4 where it is generally aligned with the shaft 12 but disposed transverse to the first handle 14. In this second position the crosspiece 18c of the handle 18 forms a wrist and/or forearm backing support for a user grasping the first handle 14 with one hand. By locking the second handle in the second position grasping the first handle with one hand, and pressing down on the crosspiece with his wrist or forearm, the user is able to apply additional leverage in a direction tending to lift the trimmer clear of the ground.

Referring next to FIGS. 5–8, a locking mechanism for locking the second handle 18 in any desired position is illustrated. The second handle 18 is secured to the first handle 14 by a cam-lock mechanism 25. This consists of a cam-lock lever 20 pivotally connected at one end of the spindle 19. The spindle 19 is first inserted through aligned openings in the two handles and secured with a nut 23. With the cam-lock lever 20 in its locked position within the recessed portion 21 of the second handle arm 18a, the two side arms 18a, 18b of the second handle are urged inwardly against the opposite sides of the first handle 14 and relative rotation is prevented by interlocking the opposing faces of the two handles. In particular, the respective faces 31a, 31b of the side arms 18a, 18b each have a pair of perpendicular grooves 29 (FIG. 8) which engage with respective pairs of diametrically opposed teeth 28 angularly disposed around the central opening 27 for the spindle 19 in the opposing face 14b of the first handle 14. With this arrangement the second handle can be locked in a number of alternative positions in increments corresponding to the angular spacing of the teeth 28.

Figure 6:
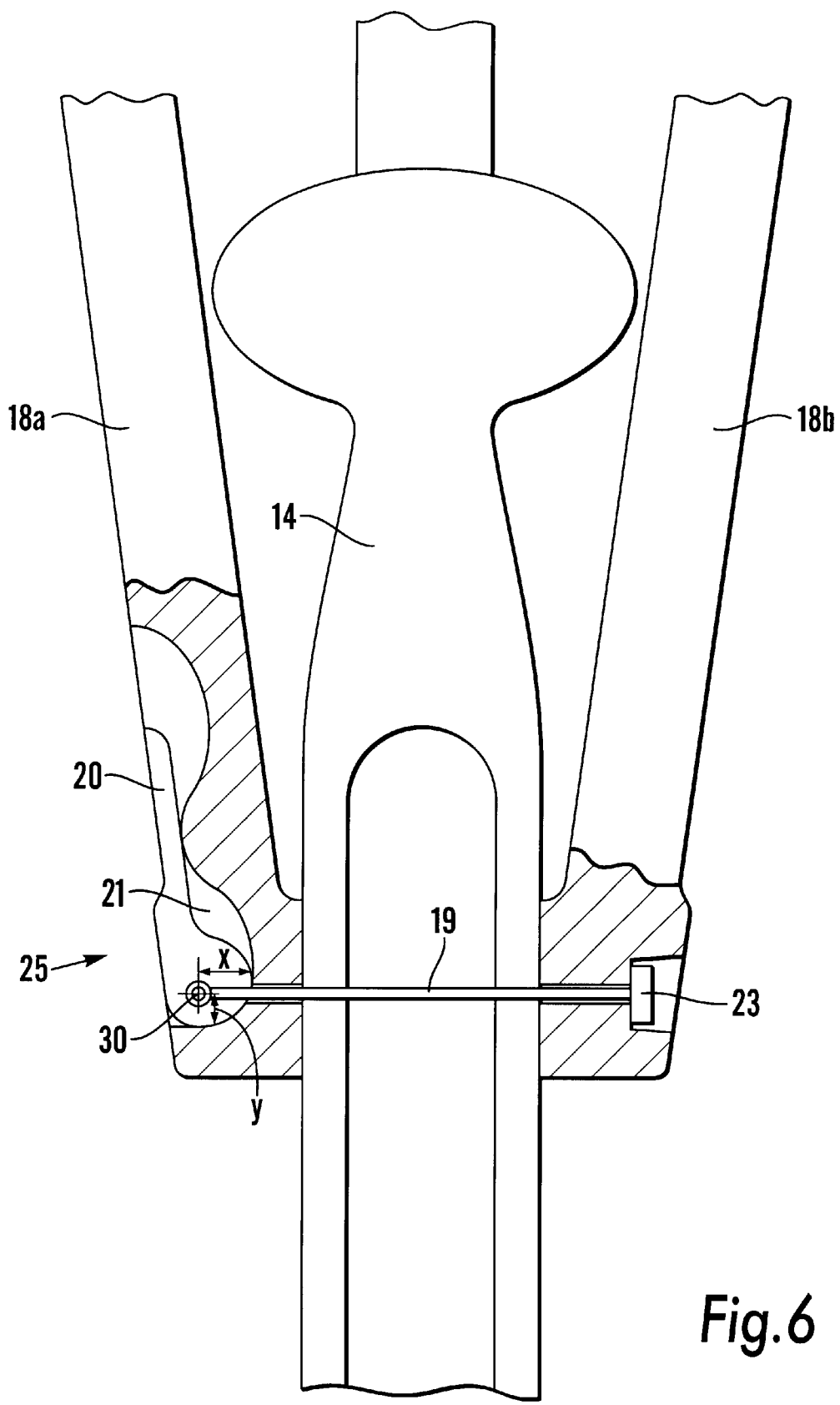
FIG. 6 is a diagrammatic illustration of the handle locking mechanism in a locked state.
Figure 7:
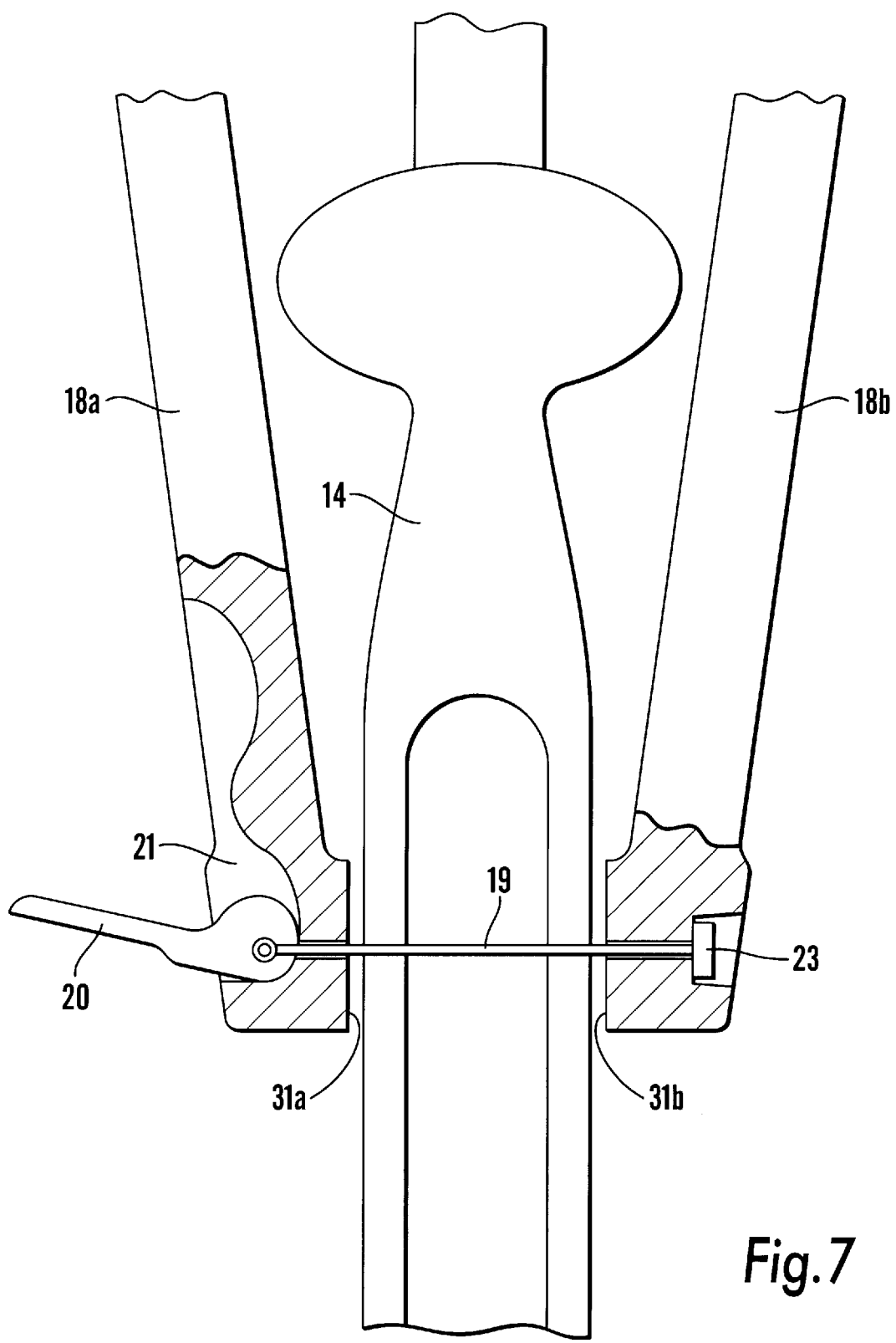
FIG. 7 is a diagrammatic illustration showing the handle locking mechanism in an unlocked state.
Figure 8:
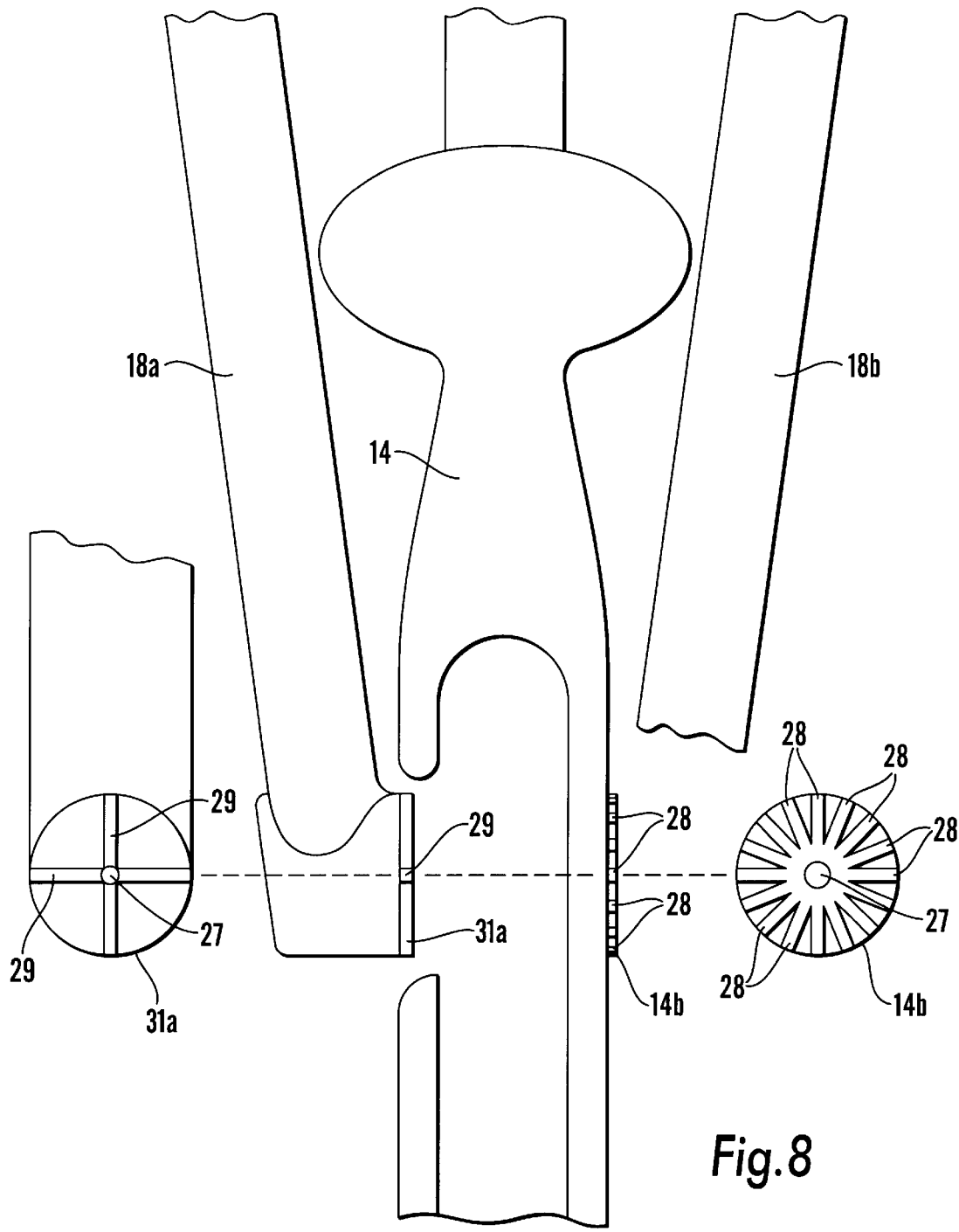
FIG. 8 is a diagrammatic illustration of the handle locking mechanism with parts broken away to illustrate further details.

The interlock is released by rotating the cam-lock lever 20 anti-clockwise about its pivot 30 from the position shown in FIG. 6 to the position shown in FIG. 7. Because the distance 'y' is less than the distance 'x' on the cam-lock lever, the second handle 18 is able to spring apart from the first handle 14 and clear of the interlocking teeth. The handle 18 can then be pivoted back from the position shown in full outline in FIG. 5 to the position shown in dashed outline or to any other position in which the teeth 28 mesh with the grooves 29 when the cam-lock lever is returned to its locked position shown in FIG. 6. For example, the handle 18 may be rotated beyond the position shown in dashed outline to a position at the rear of the shaft 12. This has the advantage that the tool can then be used for edging a lawn as well as for trimming.

What is claimed is:

1. A hand-held tool comprising:
    a first handle extending upwardly and rearwardly from a powered working tool and having a top end and a bottom end, the first handle being a fixed handle and including a closed loop portion that is grasped by the user at the top end of the handle; and
    a second handle pivotally secured to the first handle and adjustable between a first position and a second position,
        the second handle in the first position extending forwardly of the first handle and cooperating with the first handle to provide for two-handed operation,
        the second handle including a pair of side arms pivotally mounted on a spindle passing through the top end of the first handle, and a cross-piece joining the pair of side arms, and
        wherein the second handle in the second position is generally aligned with the first handle and extends beyond the top end of the first handle with the cross-piece of the second handle positioned behind and adjacent a wrist and/or forearm of a user grasping the top end of the first handle with one hand to thereby provide backing support for the wrist and/or forearm during single-handed operation.

2. A hand-held tool as claimed in claim 1 further comprising means for releasably locking the second handle in either one of the said two positions.

3. A hand-held tool as claimed in claim 1, wherein at least one of the said first position and second position is adjustable and the second handle is releasably lockable in any one of a plurality of predetermined first and second positions.

4. A hand-held tool as claimed in claim 1, wherein the first handle includes a handle shaft connecting the closed loop of the handle to the working tool, and wherein the second handle pivots from the first position to the second position about an axis transverse to the handle shaft.

5. A hand-held tool as claimed in claim 1, wherein the working tool is a vegetation line trimmer.

6. A hand-held tool according to claim 1, wherein a portion of the first handle extends forward of the second handle, when the second handle is in the second position.

7. A hand-held tool comprising:
    a powered vegetation line trimmer;
    a first handle extending upwardly and rearwardly from the line trimmer and having a top end and a bottom end; and
    a second handle secured to the first handle and adjustable between a first position and a second position, the second handle in the first position extending forwardly of the first handle and cooperating with the first handle to provide for two-handed operation of the trimmer, and wherein the second handle in the second position is generally aligned with the first handle and extends beyond the top end of the first handle with a portion of the second handle positioned behind and adjacent a wrist and/or forearm of a user grasping the top end of the first handle with one hand to thereby provide backing support for the wrist and/or forearm during single-handed operation of the trimmer.

8. A hand-held tool as claimed in claim 7, wherein the second handle is pivotally mounted for movement between the first position and the second position, and wherein the hand-held tool further comprises means for releasably locking the second handle in either one of the said two positions.

9. A hand-held tool as claimed in claim 7, wherein at least one of the said first position and second position is adjustable and the second handle is releasably lockable in any one of a plurality of predetermined first and second positions.

10. A hand-held tool according to claim 7, wherein the first handle is a fixed handle and includes a closed loop portion that is grasped by the user at the top end of the handle.

11. A hand-held tool according to claim 10, wherein the second handle is pivotally secured to the closed loop portion of the first handle.

12. A hand-held tool according to claim 11, wherein the second handle includes a pair of side arms pivotally mounted on a spindle passing through the top end of the first handle, and a cross-piece joining the pair of side arms, the cross-piece providing the backing support when the second handle is in the second position and the user is grasping the closed loop portion of the first handle with one hand.

13. A hand-held tool as claimed in claim 10, wherein the first handle includes a handle shaft connecting the closed loop of the handle to the powered line trimmer, and wherein the second handle pivots from the first position to the second position about an axis transverse to the handle shaft.

14. A hand-held tool as claimed in claim 11, wherein the first handle includes a handle shaft connecting the closed loop of the handle to the powered line trimmer, and wherein the second handle pivots from the first position to the second position about an axis transverse to the handle shaft.

15. A hand-held tool as claimed in claim 8, wherein at least one of the first position and the second position is adjustable and the second handle is releasably lockable in any one of a plurality of predetermined first and second positions.

16. A hand-held tool according to claim 9, wherein a portion of the first handle extends forward of the second handle, when the second handle is in the second position.

17. A hand-held tool having a first handle and a second handle at one end of a handle shaft, wherein a powered work tool is located at the opposite end of the handle shaft, wherein the first handle is a fixed handle and includes a closed loop portion at the top end of the handle shaft projecting forwardly of the shaft, wherein the second handle is adjustable between a first position and a second position, the second handle in the first position cooperating with the first handle to provide for two-handed operation, and the second handle in the second position cooperating with the first handle to provide support for the wrist and/or forearm of a user grasping the first handle with one hand in a single-handed operation, wherein the second handle in the first position projects forwardly of the shaft beyond the first handle, and wherein the second handle in the second position extends upwardly beyond the top end of the handle shaft and beyond the closed loop portion of the first handle, the second handle being located to the rear of the closed loop portion, the second handle including a pair of side arms pivotally mounted on a spindle passing through the top end of the handle shaft, and a cross-piece joining the side arms, the cross-piece providing the wrist and/or forearm support when the second handle is in the second position and the user is grasping the closed loop of the first handle with one hand.

* * * * *

UNITED STATES PATENT AND TRADEMARK OFFICE
CERTIFICATE OF CORRECTION

PATENT NO.    : 6,327,781 B1
DATED         : December 11, 2001
INVENTOR(S)   : Peter Lee Sinclair and Nicholas John Butcher It is certified that error appears in the above-identified patent and that said Letters Patent is hereby corrected as shown below:

<u>Title page,</u>
Item [30] should read as follows:

-- [30] Foreign Application Priority Data
  Jan. 18, 1999 (GB) 9901056

Signed and Sealed this

Eleventh Day of June, 2002

*Attest:*

*Attesting Officer*

JAMES E. ROGAN
*Director of the United States Patent and Trademark Office*